(12) United States Patent
Luo et al.

(10) Patent No.: US 8,582,505 B2
(45) Date of Patent: Nov. 12, 2013

(54) APPARATUS AND METHOD FOR PHYSICAL BROADCAST CHANNEL (PBCH) DECODING FOR MULTIPLE CELLS

(75) Inventors: Tao Luo, San Diego, CA (US); Ke Liu, San Diego, CA (US); Kapil Bhattad, San Diego, CA (US); Taesang Yoo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 13/117,033

(22) Filed: May 26, 2011

(65) Prior Publication Data

US 2011/0292875 A1 Dec. 1, 2011

Related U.S. Application Data

(60) Provisional application No. 61/349,647, filed on May 28, 2010.

(51) Int. Cl.
*H04W 4/00* (2009.01)
(52) U.S. Cl.
USPC ........... 370/328; 375/346; 455/63.1; 455/296
(58) Field of Classification Search
None
See application file for complete search history.

(56) References Cited

U.S. PATENT DOCUMENTS

| 2003/0119451 | A1* | 6/2003 | Jang et al. ............... 455/67.3 |
| 2009/0252075 | A1 | 10/2009 | Ji et al. |
| 2010/0008282 | A1* | 1/2010 | Bhattad et al. ........... 370/312 |
| 2010/0029262 | A1 | 2/2010 | Wang et al. |
| 2010/0091826 | A1* | 4/2010 | Chen et al. ............... 375/224 |
| 2010/0182903 | A1 | 7/2010 | Palanki et al. |
| 2011/0002283 | A1 | 1/2011 | Drugge et al. |
| 2011/0026645 | A1 | 2/2011 | Luo et al. |
| 2011/0080896 | A1 | 4/2011 | Krishnamurthy et al. |
| 2011/0274097 | A1* | 11/2011 | Zhang et al. ............. 370/338 |

FOREIGN PATENT DOCUMENTS

WO 2010024743 A1 3/2010

OTHER PUBLICATIONS

Motorola, "Discussion of time domain eICIC scheme for Rel-10," 3GPP TSG RAN WG1 Meeting #62bis, R1-105622, Xi'an, China, Oct. 11-15, 2010, 6.8.1.1, p. 1-6.
International Search Report and Written Opinion—PCT/US2011/038424, International Search Authority—European Patent Office—Aug. 23, 2011.
Wu C-C et al: "Intercell interference cancellation for TD-CDMA mobile systems", Electronics Letters, IEE Stevenage, GB, vol. 36, No. 23, Nov. 9, 2000, pp. 1960-1961, XP006015935.
Xenofon G D0uk0p0ul0s et al: "Intercell Interference Cancellation for MC-CDMA Systems", I E E E V T S Vehicular Technology Conference. Proceedings, IEEE, US, Apr. 1, 2007, pp. 1612-1616, XP031092902, ISSN: 1550-2252 ISBN: 978-1-4244-0266-3.

* cited by examiner

*Primary Examiner* — Yong Zhou (57) ABSTRACT

A method of wireless communication includes generating a list of cells for physical broadcast channel (PBCH) decoding. The method also includes allocating memory for decoding and cancelling a subset of cells from the generated cell list. The method further includes storing information related to subsets of cells from the generated list in the allocated memory during different time periods. The allocated memory is sufficient for attempting, at each time period, decoding of each subset of cells and cancelling of decoded cells in each subset. The method further includes cycling through the generated cell list by processing each subset of the cell list during the different time periods.

22 Claims, 8 Drawing Sheets

APPARATUS AND METHOD FOR PHYSICAL BROADCAST CHANNEL (PBCH) DECODING FOR MULTIPLE CELLS

CROSS-REFERENCE TO RELATED APPLICATION

This application claims the benefit under 35 U.S.C. §119 (e) to U.S. Provisional Patent Application No. 61/349,647 entitled APPARATUS AND METHOD FOR PBCH DECODING, filed on May 28, 2010, the disclosure of which is expressly incorporated by reference herein in its entirety.

FIELD

Aspects of the present disclosure relate generally to wireless communication systems, and more particularly to decoding the physical broadcast channel (PBCH).

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities.

SUMMARY

According to an aspect of the present disclosure, a method of wireless communication includes generating a list of cells for physical broadcast channel (PBCH) decoding. The method also includes allocating memory for decoding and cancelling a subset of cells from the generated cell list. The method further includes storing information related to subsets of cells from the generated list in the allocated memory during different time periods. The allocated memory is sufficient for attempting, at each time period, decoding of each subset of cells and cancelling of decoded cells in each subset. The method further includes cycling through the generated cell list by processing each subset of the cell list during the different time periods.

In another aspect, a method of wireless communication includes receiving a new burst of physical broadcast channel (PBCH) samples. The method also includes cancelling a PBCH of each previously decoded cell from the new burst. The method further includes attempting PBCH decoding based on the new burst, after cancelling. The method also includes cancelling successfully decoded cells from the new burst and previously stored bursts. The method still further includes storing cancelled PBCH samples corresponding to a subset of received PBCH bursts for further processing.

In yet another aspect, an apparatus of wireless communication includes a memory, and at least one processor coupled to the memory. The processor(s) is configured to generate a list of cells for physical broadcast channel (PBCH) decoding. The processor(s) is also configured to allocate memory for decoding and cancelling a subset of cells from the generated cell list. The processor(s) is also configured to store information related to subsets of cells from the generated list in the allocated memory during different time periods. The allocated memory is sufficient for attempting, at each time period, decoding of each subset of cells and cancelling of decoded cells in each subset. The processor(s) is further configured to cycle through the generated cell list by processing each subset of the cell list during the different time periods.

In still another aspect, an apparatus of wireless communication includes a memory, and at least one processor coupled to the memory. The processor(s) is configured to receive a new burst of physical broadcast channel (PBCH) samples. The processor(s) is also configured to cancel a PBCH of each previously decoded cell from the new burst. The processor(s) is also configured to attempt PBCH decoding based on the new burst, after cancelling. The processor(s) is further configured to cancel successfully decoded cells from the new burst and previously stored bursts. The processor(s) is also configured to store cancelled PBCH samples corresponding to a subset of received PBCH bursts for further processing.

In another aspect, a computer program product for wireless communication in a wireless network includes a non-transitory computer-readable medium having program code recorded thereon. The program code includes program code to generate a list of cells for physical broadcast channel (PBCH) decoding. The program code also includes program code to allocate memory for decoding and cancelling a subset of cells from the generated cell list. The program code also includes program code to store information related to subsets of cells from the generated list in the allocated memory during different time periods. The allocated memory is sufficient for attempting, at each time period, decoding of each subset of cells and cancelling of decoded cells in each subset. The program code also includes program code to cycle through the generated cell list by processing each subset of the cell list during the different time periods.

In a further aspect, a computer program product for wireless communication in a wireless network includes a non-transitory computer-readable medium having program code recorded thereon. The program code includes program code to receive a new burst of physical broadcast channel (PBCH) samples. The program code also includes program code to cancel a PBCH of each previously decoded cell from the new burst. The program code also includes program code to attempt PBCH decoding based on the new burst, after cancelling. The program code further includes program code to cancel successfully decoded cells from the new burst and previously stored bursts. The program code also includes program code to store cancelled PBCH samples corresponding to a subset of received PBCH bursts for further processing.

In another aspect, an apparatus for wireless communication includes means for generating a list of cells for physical broadcast channel (PBCH) decoding. The apparatus also includes means for allocating memory for decoding and cancelling a subset of cells from the generated cell list. The apparatus also includes means for storing information related to subsets of cells from the generated list in the allocated memory during different time periods. The allocated memory is sufficient for attempting, at each time period, decoding of each subset of cells and cancelling of decoded cells in each subset. The apparatus also includes means for cycling through the generated cell list by processing each subset of the cell list during the different time periods.

In a further aspect, an apparatus for wireless communication includes means for receiving a new burst of physical broadcast channel (PBCH) samples. The apparatus also includes means for cancelling a PBCH of each previously decoded cell from the new burst. The apparatus also includes means for attempting PBCH decoding based on the new burst, after cancelling. The apparatus also includes means for cancelling successfully decoded cells from the new burst and previously stored bursts. The apparatus also includes means for storing cancelled PBCH samples corresponding to a subset of received PBCH bursts for further processing.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000, and the like. The UTRA technology includes Wideband CDMA (WCDMA) and other variants of CDMA. The CDMA2000 technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000 and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
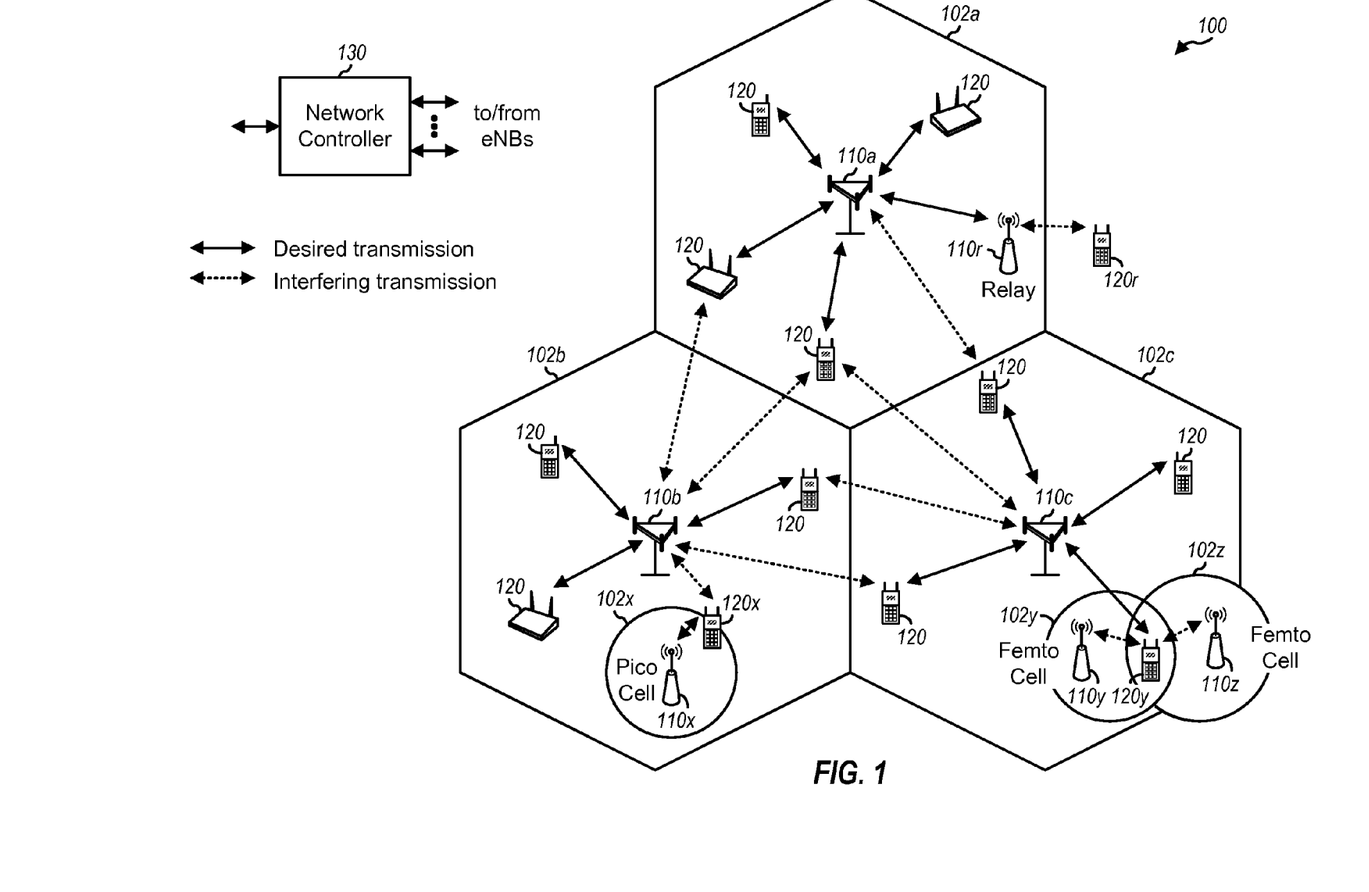
FIG. 1 is a block diagram conceptually illustrating an example of a telecommunications system.

FIG. 1 shows a wireless communication network 100, which may be an LTE-A network, in which a method for decoding the PBCH from multiple cells may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE, eNodeB, etc.). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

In one aspect, the wireless network 100 supports synchronous communications, where the eNodeBs may have similar frame timing, and transmissions from different eNodeBs which may be approximately aligned in time.

In one aspect, the wireless network 100 may support Frequency Division Duplex (FDD) or Time Division Duplex (TDD) modes of operation. The techniques described herein may be used for FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE120y, etc.) are dispersed throughout the wireless network 100, and each UE may be stationary or mobile. A UE may also be referred to as a terminal, a mobile station, a subscriber unit, a station, or the like. A UE may be a cellular/wireless phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
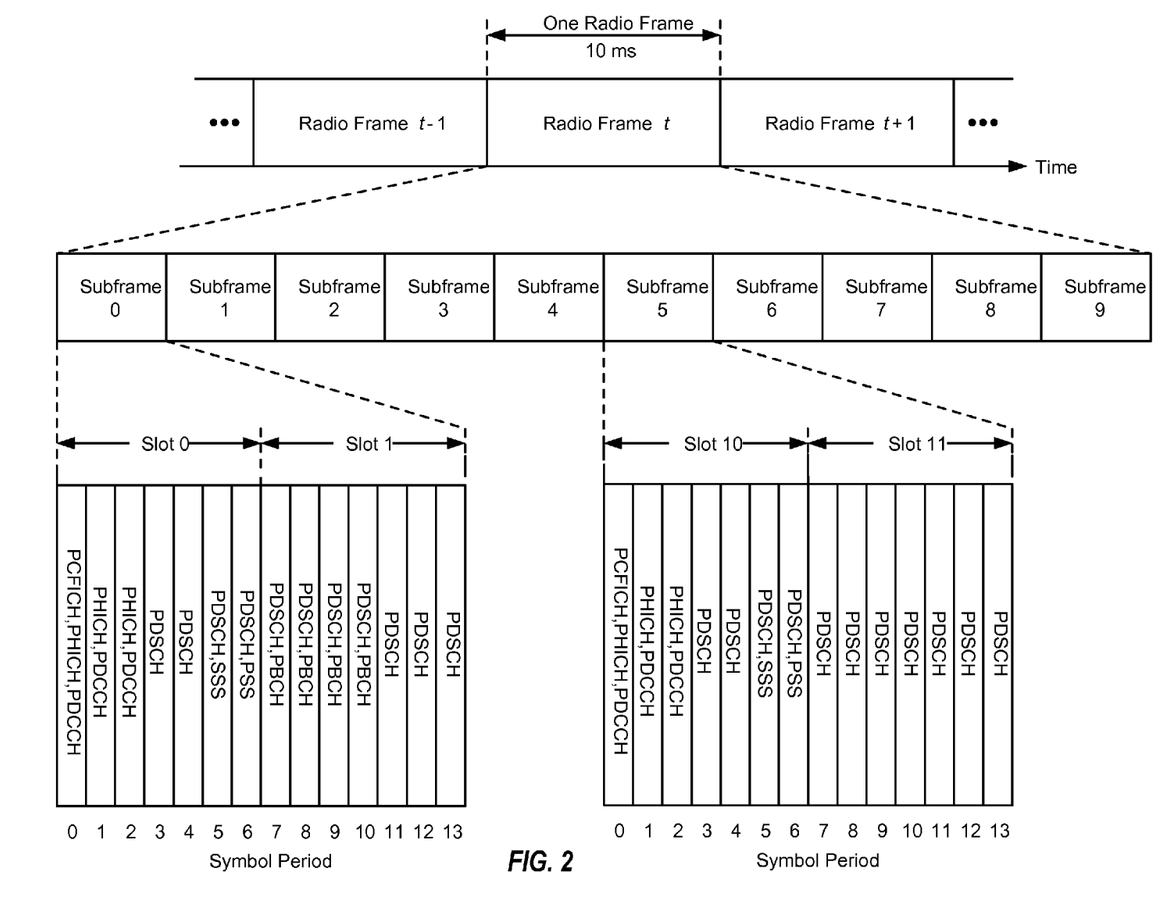
FIG. 2 is a diagram conceptually illustrating an example of a downlink frame structure in a telecommunications system.

FIG. 2 shows a downlink FDD frame structure used in LTE, including the PBCH to be decoded. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information, such as system identification and access control parameters, to UEs and may be sent at 40 ms intervals. In each 40 ms period, the PBCH payload is transmitted using four redundancy versions with one redundancy version transmitted every 10 ms. The payload for the four redundancy versions within a 40 ms period is the same but across the 40 ms periods the payload can change.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
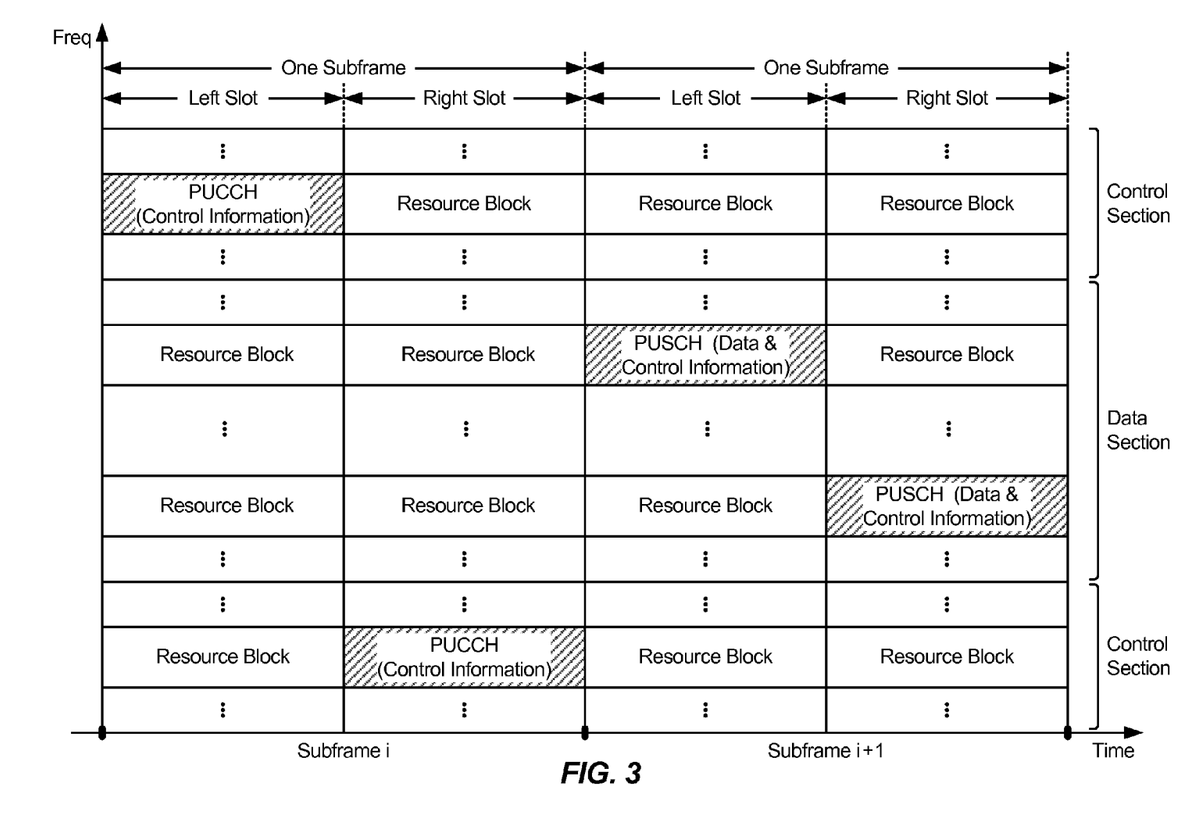
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications according to the present disclosure. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
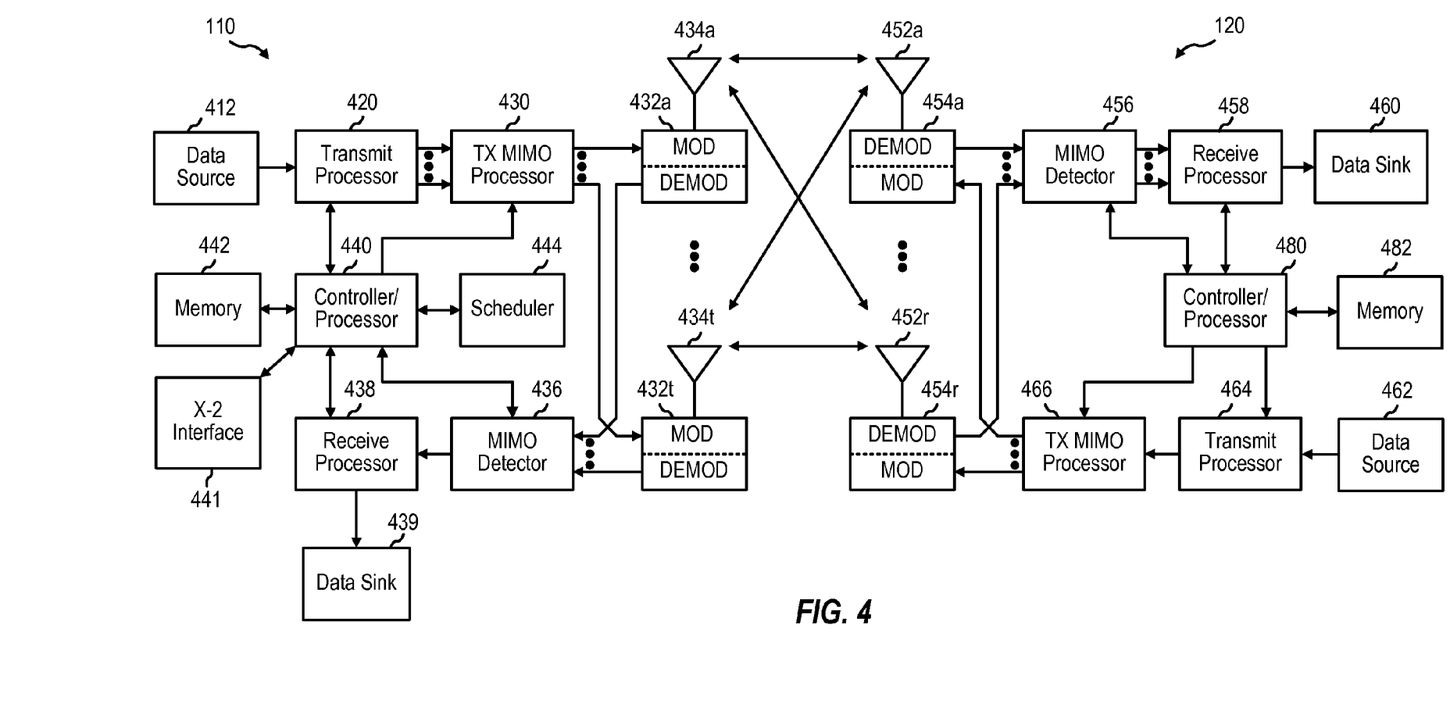
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120 in which a method for decoding the PBCH from multiple cells may be implemented. The eNodeB 110 and UE 120 may be one of the base stations/eNodeBs and one of the UEs in FIG. 1. The base station 110 may be the macro eNodeB 110*c* in FIG. 1, and the UE 120 may be the UE 120*y*. The base station 110 may also be a base station of some other type. The base station 110 may be equipped with antennas 434*a* through 434*t*, and the UE 120 may be equipped with antennas 452*a* through 452*r*.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH)

from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIGS. 6A-6B, and/or other processes for the techniques described herein. The memories 442 and 482 may store data and program codes for the base station 110 and the UE 120, respectively. A scheduler 444 may schedule UEs for data transmission on the downlink and/or uplink.

When a UE is activated, the UE searches for all available cells using synchronization signals. During the search, some fake cells are detected, in addition to true cells. The fake cells appear to exist or appear to be closer to the UE than some neighboring cells based on the received signaling (e.g., noise may appear as synchronization signals), but the cells may be far away or may not actually exist. The UE should be able to distinguish the fake cells. One way to confirm a cell is real is by decoding the PBCH. If the PBCH is successfully decoded, it can be assumed the cell is actually present.

For synchronous or quasi-synchronous LTE networks (e.g., over a certain geographic region), the Physical Broadcast Channel (PBCH) signal from neighboring cells may overlap. A UE may then be able to decode only the PBCH of the strongest cell(s) or cells which are not significantly weaker than the strongest cell.

In deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the femto eNodeB 110y. However, the UE 120y may not be able to access the femto eNodeB 110y due to restricted association and may then connect to the macro eNodeB 110c (e.g., with lower received power) or to the femto eNodeB 110z (e.g., also with lower received power). The UE 120y may then observe high interference from the femto eNodeB 110y on the downlink and may also cause high interference to the eNodeB 110y on the uplink.

In these heterogeneous network scenarios, the UE may need to decode the PBCH of cells that are significantly weaker than the strongest cells. In one example, PBCH interference cancellation (IC) can overcome decoding limitations.

The PBCH may be transmitted on subframe 0, or once every 10 subframes. In one example, the payload of PBCH is constant for 40 ms and may change beyond that time interval. The PBCH payload contains information such as the number of Physical Hybrid ARQ Indicator Channel (PHICH) groups, number of transmit antennas, system bandwidths, and the like. It should be appreciated by one skilled in the art that the payload of PBCH is not limited to the examples described above.

In one example, the PBCH interference cancellation operation includes identifying a list of cells for which PBCH decoding will be attempted in parallel. The cell list can be a list of timing hypotheses, cell IDs, and/or frequency hypotheses. The PBCH decoding may use four PBCH bursts (also referred to as redundancy versions (RVs)). However, other quantities of PBCH bursts may be used without affecting the scope or spirit of the present disclosure. The PBCH for a cell that is decoded may be cancelled and the signal after cancellation may be used to decode the PBCH of other cells in the list.

The number of cells for which PBCH decoding and cancellation is attempted in parallel may be limited due to the hardware of the UE. For example, a UE may only store and decode the PBCH of four cells at a time due to hardware limitations. Of course, other UE hardware configurations could permit simultaneous storing of fewer or more cells. For example the UE may have limited memory but may have to store log likelihood ratios (LLRs)/channel estimates, etc. of the cells being decoded in parallel and can hence only process a certain number of cells at a time.

In some designs, iterative cancellation may be employed. For example, if two cells are decoded, from the received samples, the UE may first estimate the signal of the first cell and cancel that. The UE then uses the cancelled samples to estimate the signal corresponding to the second decoded cell to cancel it to obtain updated cancelled samples. The UE then adds back the estimated signal of the first decoded cell to the cancelled samples and re-estimates the first cell signal. The re-estimated first cell signal may be more accurate than the previous estimate because the new estimate is from samples without the signal from the second decoded cell.

One aspect provides an approach for decoding more cells than permitted by hardware (e.g., four cells permitted) and to overcome the hardware limitations of the UE. This approach to overcome the receiver hardware limitation includes attempting to decode the first N number (e.g., N=4) of strongest cells in four bursts of the PBCH. In this example N is equal to 4, and the four strongest cells are decoded. Those skilled in the art will appreciate that other quantities of cells may be decoded and a different number of bursts may be used, based on the hardware configuration. The process is repeated on the cancelled samples with the next M (e.g. M=4) number of cells (or with the remaining cells) until decoding for all cells is attempted at least once. In this manner, the UE can identify true and fake cells, based on the PBCH decoding. In one design, the UE may not store any channel estimates/LLRs of cells in a previous subset once the UE starts decoding the cells in a new subset, in which case the iterative cancellation may be limited to cells in the same subset. In an alternate design, the UE may continue to store channel estimates/LLRs from the reconstructed signal of cells having PBCH successfully decoded and cancelled, but the UE may limit the number of cells the UE attempts to decode in the next subset accordingly.

Figure 5A:
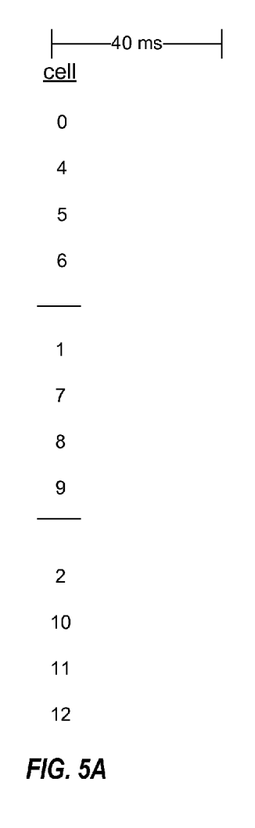
FIGS. 5A-5B illustrate analysis of cell subsets for decoding PBCH according to aspects of the present disclosure.
Figure 5B:
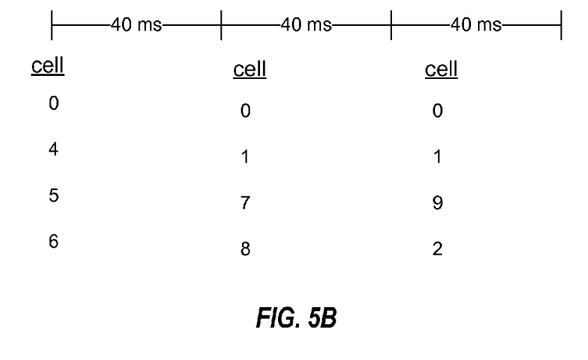

For example, FIGS. 5A and 5B illustrate decoding the PBCH in a network where the UE identifies twelve cells (e.g., cells 0-2, 4-12). In the example of FIG. 5A, the UE receives a signal including four PBCH bursts. The signal is for a predetermined period of time, e.g., 40 ms. The received PBCH data for the cells may be stored in the UE memory (e.g., memory 482 of FIG. 4). Rather than analyzing all 12 cells at once, the UE may analyze the signal of four cells at one time, in parallel. The analysis occurs based on the signal observed during the 40 ms. Thus, the cells are divided into subsets, where each subset includes four cells. In the present example, the first subset includes cells 0, 4, 5 and 6. The second subset includes cells 1, 7, 8 and 9. The third subset includes cells 2, 10, 11 and 12. The UE stores four PBCH bursts in its memory. The UE attempts to decode the first subset of cells (e.g., cells 0, 4, 5 and 6). In one example, cell 0 is successfully decoded and cells 4, 5 and 6 are not decoded because they are fake cells. The data for cell 0 then gets cancelled from the signal stored in the UE memory. Decoding is then attempted on the next subset of cells (e.g., cells 1, 7, 8 and 9). In one example, cell 1 is decoded. After decoding cell 1, the UE cancels the cell 1 information from the signal stored in memory. Decoding is then attempted on the next subset of cells (e.g., 2, 10, 11 and 12). The process continues until decoding has been attempted on all cells in all subsets.

In this example, in the first design no iterative cancellation is employed. In the second design, after attempting to decode cells 0, 4, 5, 6 and decoding cell 0, the UE stores data relating to cell 0 in addition to the cancelled samples. The UE then attempts to decode cells 1, 7, 8 in parallel in the next burst (three new cells+cell 0 in case of limitation of four cells in hardware). On decoding cell 1, the UE has sufficient information to perform iterative cancellation of cell 0 and cell 1. In some designs, the UE may retry decoding of a un-decoded cell in a higher subset if a cell in a lower subset is decoded and cancelled. To obtain the iterative cancellation benefit and/or to attempt decoding a cell in a higher subset after cancelling a cell in a lower subset, the UE may restart the PBCH decoding if two cells in different subsets are decoded by placing all the cells having PBCH successfully decoded in the first subset. The iterative cancellation though will be limited to a number of cells determined by the hardware capability.

In the above example, where four cell identifications are selected, the cells are analyzed in subsets of four. The bursts associated with the four cell IDs are stored in the buffer, and then the bursts are analyzed with respect to the next four cell IDs. All of this processing occurs based on the signal observed during the same time period, i.e., 40 ms in this example.

In another aspect, a second approach for decoding the PBCH of multiple cells includes receiving additional bursts for each subset of cells analyzed. That is, the analysis may occur over consecutive time periods. In one example, the bursts may be analyzed in 40 ms increments (because the PBCH is constant for 40 ms, four new bursts are received at each 40 ms increment).

Referring to FIG. 5B, in the first 40 ms, four bursts of PBCH are received. In this example, cells 0, 1, 2 are true cells and rest are fake. Additionally, it is assumed that cell 1 can only be decoded after cancelling cell 0, and cell 2 can only be decoded after cancelling cells 0 and 1. The UE attempts to decode the twelve cells (four cells at a time starting with cells 0, 4, 5, 6) based on these bursts. A decoding attempt of the four cells is referred to as one decoding stage. In one example, cell 0 is successfully decoded. Then, during the next 40 ms time period, fresh samples (e.g., bursts) are received and decoding is attempted for cells 0, 1, 7 and 8. The cell identifications for cells 0, 1, 7, and 8 are then parsed. Cell 0 is decoded and the channel information for cell 0 is stored in the UE memory. Next, the information for cell 0 is cancelled, and cell 1 can then be decoded. Because cells 0, 1, 7 and 8 are in the same subset, information for cells 0 and 1 can be iteratively cancelled. Subsequently, cells 0, 1, 9, 2 are analyzed in the bursts during a next 40 ms time period. Cells 0, 1 and 2 can now be decoded. In this example, if the fixed subsets are {0,4,5,6}, {1,7,8,9} and {2,10,11,12}, cell 1 and cell 2 could not be decoded. Hence, including PBCH confirmed cells from previous decoding stages in the new decoding stage is beneficial. In one design employing multiple PBCH decoding stages with cell cycling, all PBCH confirmed cells found in the previous decoding stages are included and the UE cycles through the remaining cells in the following PBCH decoding stages. In another design, the UE includes only a subset of the PBCH confirmed cells from the previous decoding stages in the following decoding stages.

To further reduce memory usage, only the current burst is stored, rather than all four bursts during a 40 ms period. Cancellation of a cell then occurs only on bursts received after successful decoding of the cell. That is, the cell cancellation is applied to bursts received subsequent to the decoding. If all bursts were stored, rather than only the current burst, the processing could return to the first burst and then cancel the cell from all bursts during the 40 ms period. In another configuration, cancellation is only performed on a subset of stored PBCH bursts. Such a configuration can reduce complexity.

In another configuration, one burst prior to the decoding is stored. In this configuration the cancelling would apply to the previous burst, as well as subsequent bursts. Rather than storing the previous burst, the bursts to be stored can be selected randomly, or based on characteristics indicating the likelihood of successful decoding, etc. The burst stored may be a burst having a larger number of PBCH cancellations, compared with other bursts.

For example, assume the UE is decoding cells 0, 1, 2, 3 with cell 0 being decoded in burst 0, cell 1 in burst 1, and cell 2 in burst 3. The UE decodes cell 0 in burst 0 and cancels cell 0 in all four bursts (bursts 0 to 3). The UE decodes cell 1 in burst 1, and cancels cell 1 only in bursts 1, 2, and 3. The UE decodes cell 2 in burst 3, and cancels cell 2 only in burst 3. Accordingly, the UE does not store the previous bursts and recompute the LLRs of undecoded cells. In the other case, the UE stores all bursts and on decoding cell 1 at burst 1, the UE goes back and cancels cell 1 from burst 0, and recomputes/updates the LLRs for the undecoded cells 2 and 3. On decoding cell 2 at burst 3, the UE goes back and cancels cell 2 from bursts 0 to 2 and also recomputes/updates LLRs for undecoded cell 3 on all four bursts. Although more memory is consumed, and more recomputations occur, better performance can be achieved because more bursts have undergone cancellation.

In some received bursts of PBCH, the stronger cell may be transmitting data while on other received bursts the stronger cell may not be transmitting data. The data may cause interference to reference signal tones of a weaker cell. The reference signal tones are for channel estimation for PBCH demodulation. The data may also cause interference to PBCH data of a weaker cell in the presence of timing and frequency offset. Hence, it may be beneficial to store bursts without data from stronger cells than bursts with data from stronger cells.

In one aspect, the UE determines whether the number of PBCH confirmed cells N (e.g., have passed a cyclic redundancy check (CRC)) is less than the hardware capability of the UE (e.g., 4). Confirmed cells include cells that have passed a cyclic redundancy check (CRC)). If yes, then different combinations of 4-N cells are decoded (N is the number of already confirmed cells) to identify new cells. In one aspect, the process begins with the strongest unconfirmed cell and then cycles through the cell list.

In one example, when more than 4 confirmed cells are identified, the process cycles through cells whose power level is at least above P dB below the third strongest confirmed cell. The P dB value may be determined based on one or more factors, such as but not limited to, application, usage, system design, user choice or other various parameters related to the operation, design or situation. Next, group two unconfirmed cells at a time (starting with the strongest unconfirmed cells), and then attempt decoding after cancelling the two strongest confirmed cells. If the new confirmed cells are found which are stronger than any of the strongest two confirmed cells, restart the process using the new order. If not, after cycling through the full list, identify the strongest 3 confirmed cells and attempt decoding one cell at a time. In one example the P dB criterion may be an additional optimization and is only used with the metric from the searcher when the searcher provides an unnormalized metric. In one example, the searcher metric may be used with the metric provided by Reference Signal Interference Cancellation (RS-IC). In another aspect, an approach to overcome the hardware limitations of the UE may include identifying a maximum number of cells M (for example, M=8) that will be considered.

Figure 6A:
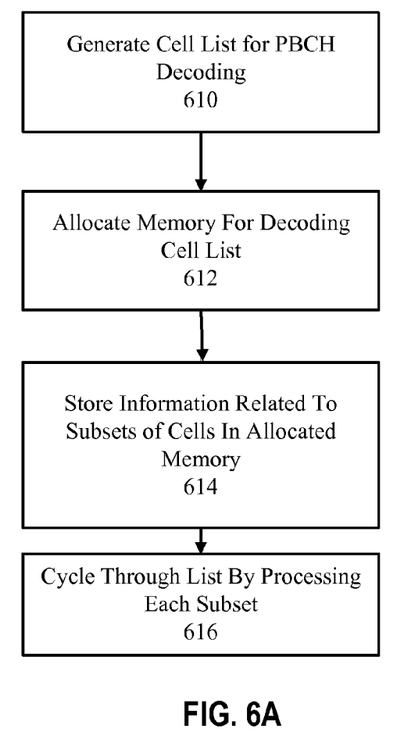
FIGS. 6A-6B are block diagrams illustrating methods for decoding PBCH of multiple cells according to aspects of the present disclosure.

FIG. 6A illustrates a method for decoding PBCH for multiple cells. At block 610, a UE generates a list of cells for physical broadcast channel (PBCH) decoding. At block 612 the UE allocates memory for decoding and cancelling a subset of cells from the generated cell list. At block 614, the UE stores information related to subsets of cells from the generated list in the allocated memory during different time periods. The allocated memory is sufficient for attempting, at each time period, decoding of each subset of cells and cancelling of decoded cells in each subset. At block 616, the UE cycles through the generated cell list by processing each subset of the cell list during the different time periods.

Figure 6B:
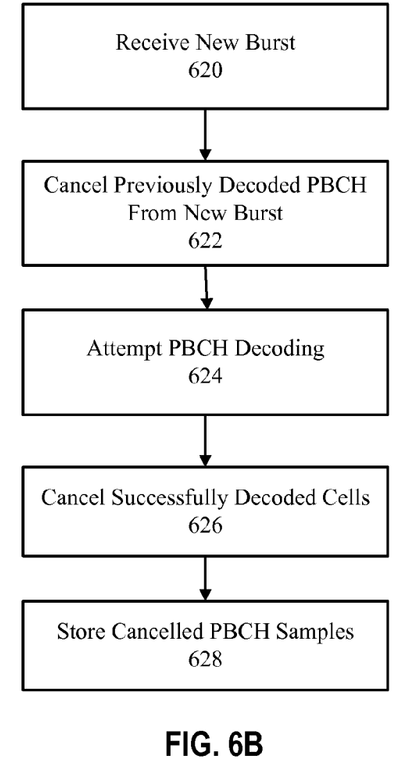

FIG. 6B illustrates a method for PBCH decoding. At block 620, a UE receives a new burst of physical broadcast channel (PBCH) samples. At block 622, the UE cancels a PBCH of each previously decoded cell from the new burst. At block 624, the UE attempts PBCH decoding based on the new burst, after cancelling. At block 626, the UE cancels successfully decoded cells from the new burst and previously stored bursts. At block 628, the UE stores cancelled PBCH samples corresponding to a subset of received PBCH bursts for further processing.

In one configuration, the UE 120 is configured for wireless communication and includes means for generating, means for allocating, means for storing subsets, means for cycling, means for receiving, means for cancelling previously decoded PBCH, means for attempting PBCH decoding, means for cancelling successfully decoded cells, and means for storing cancelled PBCH samples. In one aspect, the aforementioned means may be the controller/processor 480 and memory 482 configured to perform the functions of the aforementioned means. In another aspect, the aforementioned means may be a module or any apparatus configured to perform the functions of the aforementioned means.

Figure 7:
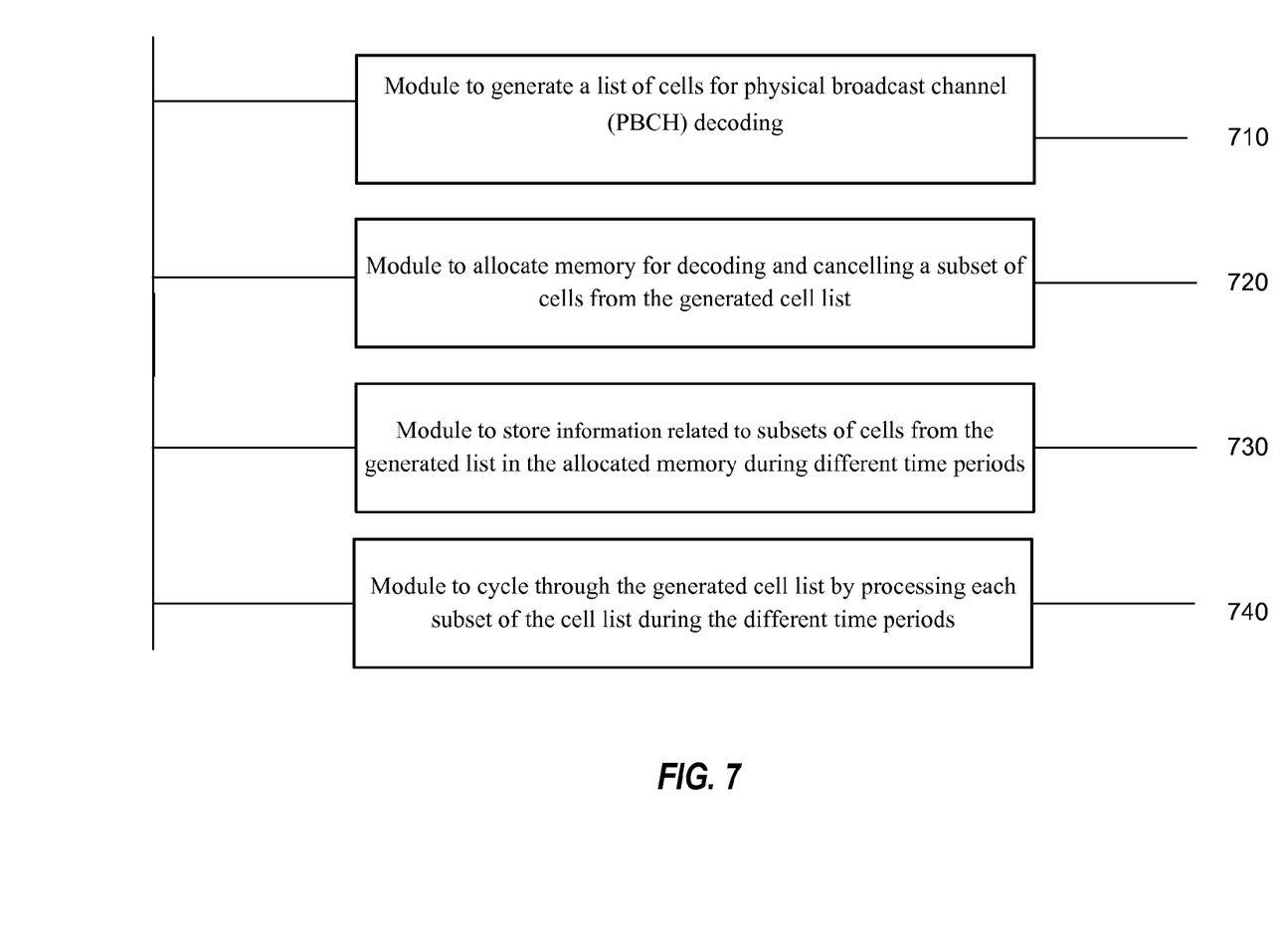
FIGS. 7 and 8 are block diagrams illustrating components for decoding PBCH of multiple cells according to aspects of the present disclosure.

FIG. 7 shows a design of an apparatus for a UE, such as the UE 120 of FIG. 4. The apparatus includes a module 710 for generating a list of cells for physical broadcast channel (PBCH) decoding. The apparatus also includes a module 720 for allocating memory for decoding and cancelling a subset of cells from the generated cell list. The apparatus further includes a module 730 for storing information related to subsets of cells from the generated list in the allocated memory during different time periods. The allocated memory is sufficient for attempting, at each time period, decoding of each subset of cells and cancelling of decoded cells in each subset. The apparatus further includes a module 740 for cycling through the generated cell list by processing each subset of the cell list during the different time periods. The modules in FIG. 7 may be processors, electronics devices, hardware devices, electronics components, logical circuits, memories, software codes, firmware codes, etc., or any combination thereof.

Figure 8:
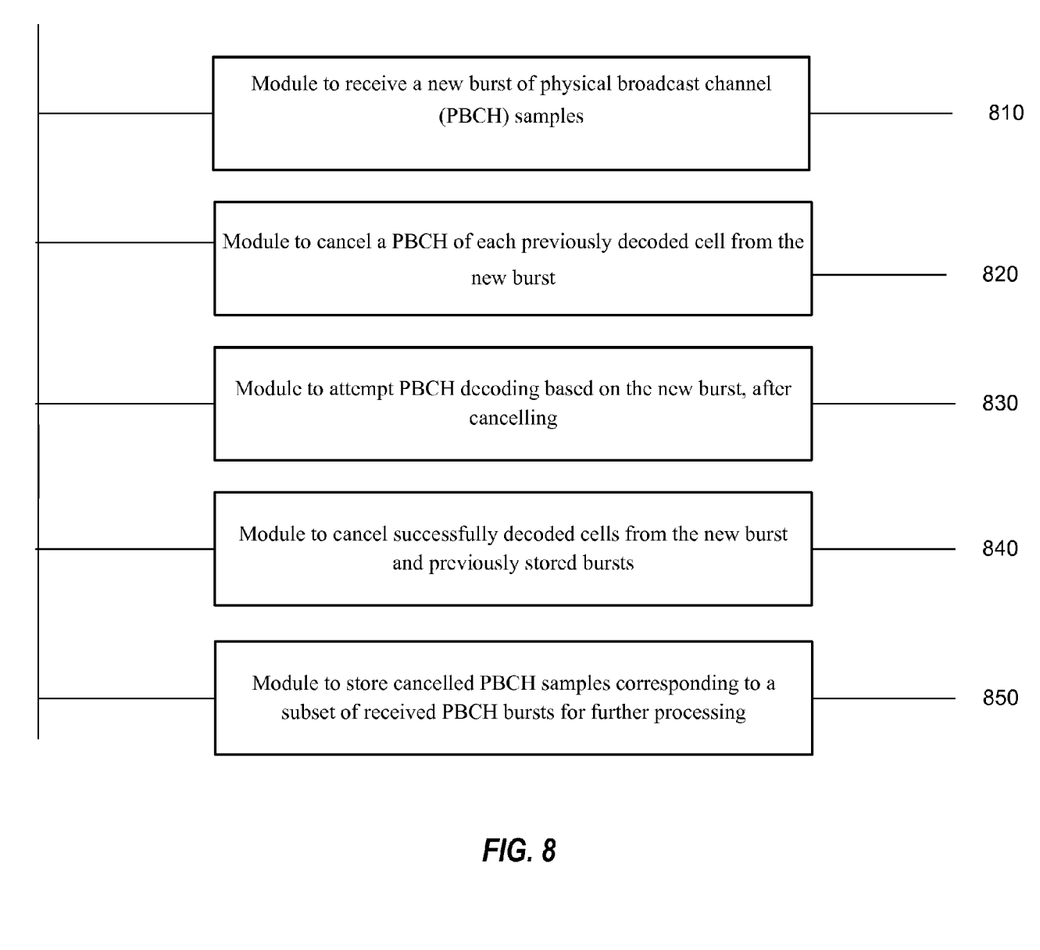

FIG. 8 shows a design of an apparatus for a UE, such as the UE 120 of FIG. 4. The apparatus includes a module 810 for receiving a new burst of physical broadcast channel (PBCH) samples. The apparatus also includes a module 820 for cancelling a PBCH of each previously decoded cell from the new burst. The apparatus also includes a module 830 for attempting PBCH decoding based on the new burst, after cancelling. The apparatus also includes a module 840 for cancelling successfully decoded cells from the new burst and previously stored bursts. The apparatus also includes a module 850 for storing cancelled PBCH samples corresponding to a subset of received PBCH bursts for further processing. The modules in FIG. 8 may be processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM, flash memory, ROM memory, EPROM memory, EEPROM memory, registers, hard disk, a removable disk, a CD-ROM, or any other form of storage medium. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or any combination thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically, e.g., with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
   generating a list of cells for physical broadcast channel (PBCH) decoding;
   allocating memory for decoding and cancelling a subset of cells from the generated cell list;
   storing information related to subsets of cells from the generated cell list in the allocated memory during different time periods, the allocated memory being sufficient for attempting, at each time period, decoding of a PBCH for each cell in each subset of cells and cancelling a decoded PBCH for each cell in each subset; and
   cycling through the generated cell list by processing each subset of the generated cell list during the different time periods.

2. The method of claim 1, in which each subset is disjoint.

3. The method of claim 1, in which a next subset of cells comprises cells not included in previous subsets and cells from previous subsets having decoded PBCHs.

4. The method of claim 1, in which PBCH decoding of each subset of cells is based on a different set of received samples.

5. The method of claim 1, in which PBCH decoding of each subset of cells is based on a subset of received samples used for PBCH decoding of a previous subset of cells.

6. A method of wireless communication, comprising:
   receiving a new burst of physical broadcast channel (PBCH) samples;
   cancelling a previously decoded PBCH from the new burst;
   attempting PBCH decoding based on the new burst, after cancelling;
   cancelling successfully decoded PBCHs from the new burst and previously stored bursts; and
   storing cancelled PBCH samples corresponding to a subset of received PBCH bursts for further processing.

7. The method of claim 6, in which the cancelling is only performed on a subset of stored PBCH bursts.

8. The method of claim 6, further comprising re-attempting decoding and updating log likelihood ratios (LLRs) for undecoded PBCHs after successfully decoding and cancelling a PBCH of a cell.

9. The method of claim 6, in which a burst to be stored is selected: randomly; based on whether an interfering cell is transmitting; based on a number of cells having PBCH cancelled on that burst; or based on a hardware limit of a number of bursts that can be stored.

10. An apparatus of wireless communication, comprising:
    a memory; and
    at least one processor coupled to the memory and configured to:
    generate a list of cells for physical broadcast channel (PBCH) decoding;
    allocate memory for decoding and cancelling a subset of cells from the generated cell list;
    store information related to subsets of cells from the generated list in the allocated memory during different time periods, the allocated memory being sufficient for attempting, at each time period, decoding of a PBCH for each cell in each subset of cells and cancelling decoded PBCH for each cell in each subset; and
    cycle through the generated cell list by processing each subset of the generated cell list during the different time periods.

11. The apparatus of claim 10, in which each subset is disjoint.

12. The apparatus of claim 10, in which a next subset of cells comprises cells not included in previous subsets and cells from previous subsets having decoded PBCHs.

13. The apparatus of claim 10, in which PBCH decoding of each subset of cells is based on a different set of received samples.

14. The apparatus of claim 10, in which PBCH decoding of each subset of cells is based on a subset of received samples used for PBCH decoding of a previous subset of cells.

15. An apparatus of wireless communication, comprising:
    a memory; and
    at least one processor coupled to the memory and configured to:
    receive a new burst of physical broadcast channel (PBCH) samples;
    cancel a previously decoded PBCH from the new burst;
    attempt PBCH decoding based on the new burst, after cancelling;
    cancel successfully decoded PBCHs from the new burst and previously stored bursts; and
    store cancelled PBCH samples corresponding to a subset of received PBCH bursts for further processing.

16. The apparatus of claim 15, in which the at least one processor is further configured to only perform the cancelling on a subset of stored PBCH bursts.

17. The apparatus of claim 15, in which the at least one processor is further configured to re-attempt decoding and update log likelihood ratios (LLRs) for undecoded PBCHs after successfully decoding and cancelling a PBCH of a cell.

18. The apparatus of claim 15, in which the at least one processor is further configured to select a burst to be stored: randomly; based on whether an interfering cell is transmitting; based on a number of cells having PBCH cancelled on that burst; or based on a hardware limit of a number of bursts that can be stored.

19. A computer program product for wireless communication in a wireless network, comprising:
- a non-transitory computer-readable medium having program code recorded thereon, the program code comprising:
- program code to generate a list of cells for physical broadcast channel (PBCH) decoding;
- program code to allocate memory for decoding and cancelling a subset of cells from the generated cell list;
- program code to store information related to subsets of cells from the generated cell list in the allocated memory during different time periods, the allocated memory being sufficient for attempting, at each time period, decoding of a PBCH for each cell in each subset of cells and cancelling a decoded PBCH for each cell in each subset; and
- program code to cycle through the generated cell list by processing each subset of the generated cell list during the different time periods.

20. A computer program product for wireless communication in a wireless network, comprising:
- a non-transitory computer-readable medium having program code recorded thereon, the program code comprising:
- program code to receive a new burst of physical broadcast channel (PBCH) samples;
- program code to cancel a previously decoded PBCH from the new burst;
- program code to attempt PBCH decoding based on the new burst, after cancelling;
- program code to cancel successfully decoded PBCHs from the new burst and previously stored bursts; and
- program code to store cancelled PBCH samples corresponding to a subset of received PBCH bursts for further processing.

21. An apparatus for wireless communication, comprising:
- means for generating a list of cells for physical broadcast channel (PBCH) decoding;
- means for allocating memory for decoding and cancelling a subset of cells from the generated cell list;
- means for storing information related to subsets of cells from the generated cell list in the allocated memory during different time periods, the allocated memory being sufficient for attempting, at each time period, decoding of a PBCH for each cell in each subset of cells and cancelling a decoded PBCH for each cell in each subset; and
- means for cycling through the generated cell list by processing each subset of the generated cell list during the different time periods.

22. An apparatus for wireless communication, comprising:
- means for receiving a new burst of physical broadcast channel (PBCH) samples;
- means for cancelling a previously decoded PBCH from the new burst;
- means for attempting PBCH decoding based on the new burst, after cancelling;
- means for cancelling successfully decoded PBCHs from the new burst and previously stored bursts; and
- means for storing cancelled PBCH samples corresponding to a subset of received PBCH bursts for further processing.

* * * * *